United States Patent
Bahr (10) Patent No.: US 12,490,126 B1
(45) Date of Patent: Dec. 2, 2025

(54) SYSTEMS AND METHODS FOR EVALUATING A WIRELESS COMMUNICATION ENVIRONMENT

(71) Applicant: Cable Television Laboratories, Inc., Louisville, CO (US)

(72) Inventor: John C. Bahr, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 549 days.

(21) Appl. No.: 17/815,179

(22) Filed: Jul. 26, 2022

Related U.S. Application Data (60) Provisional application No. 63/225,648, filed on Jul. 26, 2021.

(51) Int. Cl.
*H04W 24/08* (2009.01)

(52) U.S. Cl.
CPC .................................. *H04W 24/08* (2013.01)

(58) Field of Classification Search
CPC ..... H04W 84/12; H04W 24/10; H04W 48/16; H04W 88/08; H04W 88/02; H04W 92/20; H04W 36/0058; H04W 84/18; H04W 88/12; H04W 76/19; H04W 36/0061; H04W 36/08; H04W 48/18; H04W 88/06; H04W 36/06; H04W 72/541; H04W 76/10; H04W 36/0007; H04W 36/00; H04W 48/20; H04W 72/54; H04W 74/00; H04W 72/542; H04W 24/08
See application file for complete search history.

(56) References Cited

U.S. PATENT DOCUMENTS

| | | | | |
|---|---|---|---|---|
| 2006/0104229 A1* | 5/2006 | Vannithamby | ...... | H04W 72/541 370/328 |
| 2006/0133308 A1* | 6/2006 | Madan | ................... | H04W 48/20 370/252 |
| 2009/0252064 A1* | 10/2009 | Rangarajan | ........... | H04W 28/18 370/256 |
| 2012/0314614 A1* | 12/2012 | Wentink | ................ | H04W 36/06 370/252 |
| 2016/0135115 A1* | 5/2016 | Patil | ........................ | H04W 4/80 370/338 |
| 2018/0234985 A1* | 8/2018 | Filoche | ................ | H04B 17/318 |
| 2018/0352493 A1* | 12/2018 | Strater | ............. | H04W 36/0085 |
| 2019/0174383 A1* | 6/2019 | Zhang | ................... | H04W 88/08 |
| 2021/0282212 A1* | 9/2021 | Maruhashi | ........... | H04W 76/20 |
| 2022/0150819 A1* | 5/2022 | Park | ...................... | H04W 72/12 |

FOREIGN PATENT DOCUMENTS

EP    2728910 A1 *   5/2014    ............ H04W 36/08

* cited by examiner

*Primary Examiner* — Olumide Ajibade Akonai
(74) *Attorney, Agent, or Firm* — PdZ Patent Law, PLLC (57) ABSTRACT

A method for evaluating a wireless communication environment includes (1) causing each of a first wireless base station and a second wireless base station to operate in a respective coordination operating mode where each of the first and second wireless base stations supports wireless communication using a common wireless communication channel, and (2) receiving first environmental data from the first wireless base station, the first environmental data representing one or more characteristics of the common wireless communication channel from a perspective of the first wireless base station.

17 Claims, 7 Drawing Sheets

| Sender 302 | | Recipient 304 | |
|---|---|---|---|
| Time 306 | Duration 308 | Channel 310 | Bandwidth 312 |

| Reporting Wireless Base Station Identity 702 | Coordination Event Date and Time 704 |
|---|---|
| WBS 108; RSSI=X 706 ||
| WBS 106; RSSI=Y 708 ||

| Wireless Base Station | Channel | Transmission Power | Bandwidth |
|---|---|---|---|
| 104 | A | W | J |
| 108 | B | X | K |
| 110 | A | Y | L |
| 112 | B | Z | M |

| Wireless Base Station | Channel | Transmission Power | Bandwidth |
|---|---|---|---|
| 104 | A | W | J |

904 ↘

| Wireless Base Station | Channel | Transmission Power | Bandwidth |
|---|---|---|---|
| 108 | B | X | K |

906 ↘

| Wireless Base Station | Channel | Transmission Power | Bandwidth |
|---|---|---|---|
| 110 | A | Y | L |

906 ↘

| Wireless Base Station | Channel | Transmission Power | Bandwidth |
|---|---|---|---|
| 112 | B | Z | M |

SYSTEMS AND METHODS FOR EVALUATING A WIRELESS COMMUNICATION ENVIRONMENT

CROSS REFERENCE TO RELATED APPLICATIONS

This application claims the benefit of priority to U.S. Provisional Patent Application Ser. No. 63/225,648, filed on Jul. 26, 2021, which is incorporated herein by reference.

BACKGROUND

Wireless communication networks are commonly used to provide wireless access to a backhaul communication link, including but not limited to, an Ethernet backhaul communication link, a cable backhaul communication link (e.g., a Data Over Cable Service Interface Specification (DOCSIS) backhaul communication link, a Multi-Media over Coax (MoCA) backhaul communication link, or a HomePNA (G.hn) backhaul communication link), an optical backhaul communication link (e.g., an Ethernet passive optical network (EPON) backhaul communication link, a radio frequency of over glass (RFOG or RFoG) backhaul communication link, a Gigabit-capable passive optical network (GPON) backhaul communication link, a coherent passive optical network (CPON) backhaul communication link, a free space optical backhaul communication link), a wireless backhaul communication link (e.g., a satellite wireless backhaul communication link or a fixed wireless backhaul communication link), or a converged backhaul communication link including two or more different types communication links (e.g., a converged wireline-wireless backhaul communication link, a converged wireless-wireless backhaul communication link, or a converged wireline-wireline backhaul communication link). Examples of wireless communication networks include, but are not limited to, Wi-Fi wireless communication networks, cellular wireless communication networks, Bluetooth wireless communication networks, long range (LoRa) wireless communication networks, Zigbee wireless communication networks, and satellite wireless communication networks.

Wi-Fi wireless communication networks have become very popular, partly due to the relatively low-cost and wide availability of Wi-Fi hardware. For example, residences and businesses often have private Wi-Fi wireless communication networks to provide wireless communication services within their premises. As another example, communication service providers and other parties are increasingly operating community Wi-Fi wireless communication networks that may be available for use by multiple parties, such as by subscribers of a communication service provider or by customers of a business.

DETAILED DESCRIPTION OF THE EMBODIMENTS

In a dense radio frequency (RF) environment, such as in a multiple dwelling unit (MDU) building, wireless base stations may be sufficiently close to each other that they may interfere with each other. Such interference can be mitigated, or even eliminated, by coordinating the wireless base stations. For example, potentially interfering wireless base stations can be coordinated to operate on different respective wireless communication channels to minimize likelihood of interference. As another example, transmit power levels can be coordinated on potentially interfering wireless base stations to minimize likelihood of interference. Wireless base station coordination, however, may be difficult to perform in practice. For example, wireless base station coordination requires knowledge of potentially interfering wireless base stations. Such information, though, is generally unknown to an entity desiring to coordinate wireless base station operation. For example, a communication service provider typically does not know how many wireless base stations a given subscriber may operate, much less where the subscriber has placed the wireless base stations in its premises. As another example, a communication service provider typically has no insight into communication equipment operated by parties who do not subscribe to the service provider's communication service, such as parties who subscribe to a competitor's communication service. Furthermore, wireless base station locations may change over time, such that wireless base station coordination may need to be updated from time to time to remain effective at mitigating interference.

A conventional approach to determining a RF environment of a given wireless base station is to (a) take the wireless base station off-line for a period of time and (b) cause the wireless base station to listen for signals transmitted by other wireless base stations while the wireless base station is off-line, so that the wireless base station can identify channels not being used by other wireless base stations. Such approach, however, has significant drawbacks. For example, there is no guarantee that other wireless base stations in the vicinity of the given wireless base station will necessarily transmit signals while the wireless base station is taken off-line. As such, signals detected by the given wireless base station may not represent a typical RF environment of the wireless base station, much less a worst case RF environment of the wireless base station. As another example, taking the given base station off-line prevents the wireless base station from serving clients, thereby impairing, or completely interrupting, service to the clients.

Disclosed herein are systems and methods for evaluating a wireless communication environment which may at least partially overcome the problems discussed above. In certain embodiments, a coordination entity causes each wireless base station of a plurality of wireless base stations to temporarily participate in a coordination event, to determine respective environmental data for each wireless base station. Each wireless base station operates on a common wireless communication channel during the coordination event, and each wireless base station can therefore detect signals transmitted by each other wireless base station that is within range and is participating in the coordination event. Each wireless base station subsequently generates respective environmental data at least partially based on wireless communication signals detected by the wireless base station during the coordination event. The environmental data for a given wireless base station represents one or more characteristics of the common wireless communication channel from a perspective of the wireless base station, such as one or more of the following characteristics: (a) quantity of other wireless base stations within range of the given wireless base station that is using the common wireless communication channel, (b) identification of other wireless base stations within range of the given wireless base station that are using the common wireless communication channel, (c) received signal strength (RSS) of respective wireless communication signals transmitted by other wireless base stations within range of the given wireless base station, and (d) quantity of wireless clients being served by the other wireless base stations.

Environmental data generated by a given wireless base optionally further includes information that is not derived from wireless communication signals detected during the coordination event. For example, environmental data generated by a given wireless base station my include characteristics of the wireless base station, such as identity of the wireless base station, wireless communication channels supported by the wireless base station, location of the wireless base station, airtime characteristics of the wireless base station, make and model of the wireless base station, RF pattern of the wireless base station, operating history of the wireless base station, etc.

Each wireless base station is configured to send its respective environmental data to a coordination entity, such as for analyzing the environmental data to provide a holistic view of the RF environment of the wireless base stations. The coordination entity optionally generates a coordination plan for the plurality of wireless base stations at least partially based on the environmental data from the wireless base stations. The coordination plan specifies, for example, one or more operating conditions for each wireless base station to help minimize interference between the wireless base stations. For example, in certain embodiments, the coordination plan specifies a respective wireless communication channel assignment for each wireless base station in a manner which helps minimize interference between the wireless base stations. As another example, in some embodiments, the coordination plan specifies a respective transmission power for each wireless base station in a manner which achieves a desired compromise between minimizing interference between wireless base stations and maximizing wireless base station range and performance. In some embodiments, the coordination plan is dynamic in that it specifies wireless base station operating conditions as a function of time and/or one or more other parameters.

In particular embodiments, each wireless base station continues to wirelessly communicate with its respective wireless clients over the common wireless communication channel during a coordination event. Consequently, wireless clients continue to be supported during the coordination event, albeit with possible reduced performance because all participating wireless base stations are sharing a common wireless communication channel during the coordination event. Additionally, the fact that the wireless base stations continue to support their clients during the coordination event helps ensure that environmental data generated by the wireless base stations during the coordination event is realistic, on in other words, that the environmental data reflects the wireless communication environment under real operating conditions.

Figure 1:
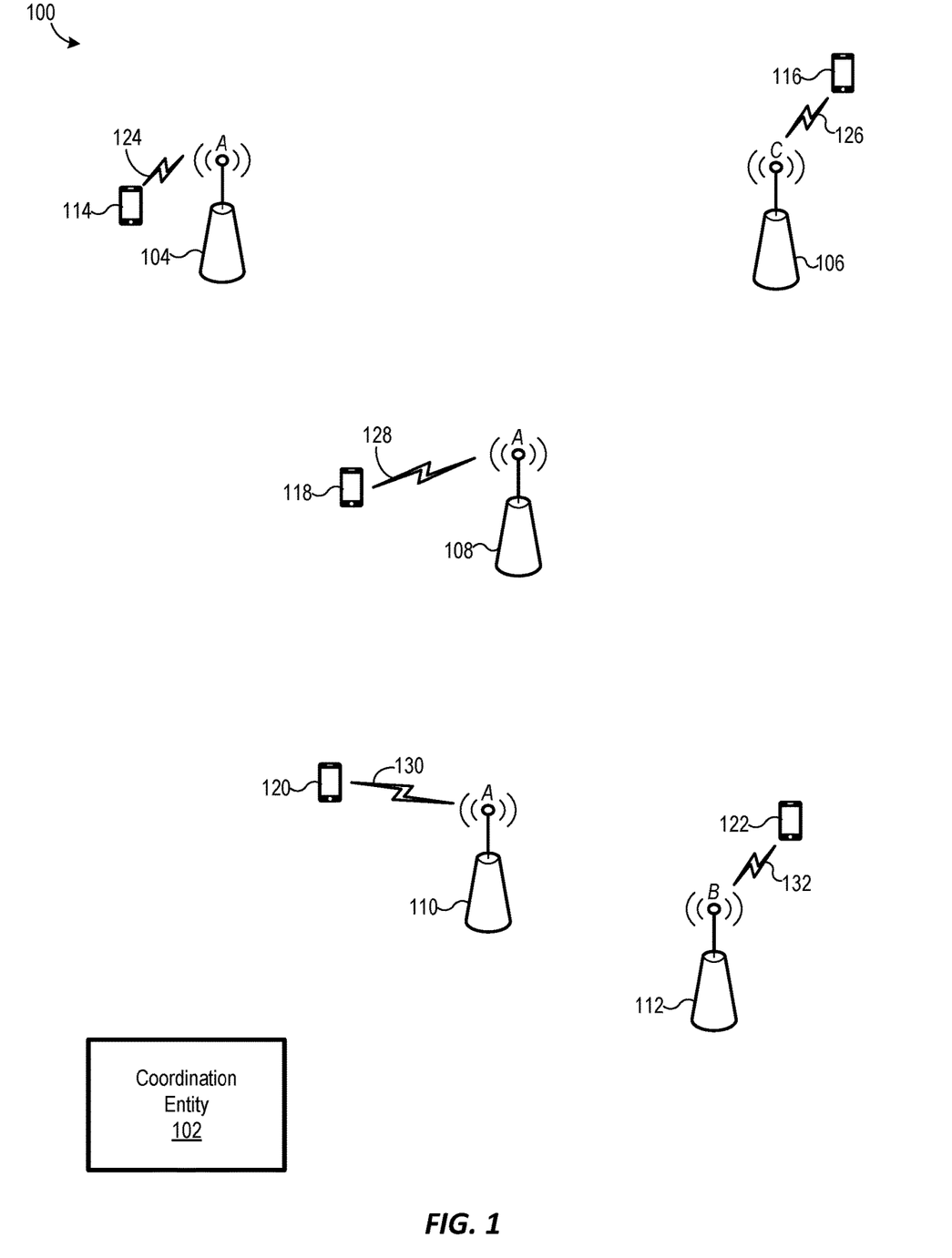
FIG. 1 is a block diagram of a communication network including a system for evaluating a wireless communication environment, according to an embodiment.

FIG. 1 is a block diagram of a communication network 100 which includes an embodiment of the new systems for evaluating a wireless communication environment. Communication network 100 includes a coordination entity 102 and wireless base stations 104, 106, 108, 110, and 112, although the quantity of wireless base stations of communication network 100 may vary. FIG. 1 depicts wireless base stations 104, 106, 108, 110, and 112 communicating with wireless clients 114, 116, 118, 120, and 122 via wireless communication signals 124, 126, 128, 130, and 132, respectively. Although each wireless client 114, 116, 118, 120, and 122 is depicted as being a mobile telephone, the configuration of the wireless clients may vary. For example, in some embodiments, one or more of wireless clients 114, 116, 118, 120, and 122 are instead a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless base station, an integrated access and backhaul (IAB) base station, a microcell, a picocell, a femtocell, a macrocell, a Wi-Fi-based application, a satellite communication device, etc.).

Additionally, while FIG. 1 depicts each wireless base station 104, 106, 108, 110, and 112 as supporting a single wireless client, the number of wireless clients supported by a given wireless base station may vary. For example, it is anticipated that one or more of wireless base stations 104, 106, 108, 110, and 112 will frequently support a plurality of wireless clients at a given time. As another example, one or more of wireless base stations 104, 106, 108, 110, and 112 may not be supporting any wireless clients at a given time.

Each wireless base station 104, 106, 108, 110, and 112 is configured to communicate with wireless clients using unlicensed RF spectrum and/or licensed RF spectrum. Some embodiments of wireless base stations 104, 106, 108, 110, and 112 are configured operate using one or more of RF spectrum in the 900 MHz band, RF spectrum in the 2.4 GHz band, RF spectrum in the 5 GHz band, RF spectrum in the 6 GHz band, and RF spectrum in the 60 GHZ band. It is understood, however, that wireless base stations 104, 106, 108, 110, and 112 are not limited to operating in these RF bands, and wireless base stations 104, 106, 108, 110, and 112 could be configured to operate in essentially any one or more RF bands, including any RF bands designated in the future for communication use. In certain embodiments, wireless base stations 104, 106, 108, 110, and 112 are configured to operate according to one or more of a Wi-Fi communication protocol (e.g., a protocol based on an Institute of Electrical and Electronics Engineers (IEEE) 802.11 protocol), a Bluetooth communication protocol, a long range (LoRa) wireless communication protocol, a Zigbee wireless communication protocol, and any variations, improvements, and/or evolutions thereof. Additionally, some embodiments of wireless base stations 104, 106, 108, 110, and 112 are configured to operate according to a cellular wireless communication protocol (e.g., a $3^{rd}$ Generation Partnership Project (3GPP) based protocol or a non-3GPP based protocol) and/or a satellite wireless communication protocol. Each wireless base station 104, 106, 108, 110, and 112 could be combined with one or more other devices. For example, in some embodiments, one or more of wireless base stations 104, 106, 108, 110, and 112 are co-packaged with a modem, an optical network terminal (ONT), or another communication device, to form a communication gateway or other customer premises equipment (CPE).

Each wireless base station 104, 106, 108, 110, and 112 need not have the same configuration. For example, in some embodiments, two or more of wireless base stations 104, 106, 108, 110, and 112 support different communication channels. For instance, in one embodiment, wireless base station 104 supports wireless communication channels in both of the 2.4 GHz band and the 5 GHz band, and wireless base station 106 supports communication channels in solely the 2.4 GHz band. As another example, maximum transmission power may vary among two or more wireless base stations 104, 106, 108, 110, and 112. As an additional example, in certain embodiments, wireless base station 104 is capable of operating according to both Wi-Fi and cellular communication protocols while wireless base station 106 is capable of operating according to solely a Wi-Fi communication protocol. In some embodiments, two or more of wireless base stations 104, 106, 108, 110, and 112 are associated with different parties, such as different communication service subscribers. For instance, in a particular embodiments, two or more of wireless base stations are located within different respective dwelling units of a common multi dwelling unit building.

Coordination entity 102, which is an embodiment of the new systems for evaluating a wireless communication environment, is configured to schedule a coordination event among some or all of wireless base stations 104, 106, 108, 110, and 112, as well as to receive respective environmental data associated with the coordination event from the wireless base stations. Additionally, certain embodiments of coordination entity 102 are configured to generate a coordination plan, and/or take another action, with the received environmental data. Coordination entity 102 is at least partially implemented, for example, by one or more processing devices (not shown) executing instruction, such as in the form of software and/or firmware, stored in a data store (not shown). Coordination entity 102 could be located either near wireless base stations 104, 106, 108, 110, and 112 or distant from wireless base stations 104, 106, 108, 110, and 112. Some embodiments of coordination entity 102 are implemented by a distributed computing system, such as a cloud computing system. For example, in some embodiments, coordination entity 102 is implemented in a cloud computing system, and access to coordination entity 102 is provided to wireless base stations, or to other devices and/or entities, on a subscription basis. As another example, in certain embodiments, coordination entity 102 is at least partially implemented by applications or "apps" of one or more of wireless clients 114, 116, 118, 120, and 122.

Additionally, while coordination entity 102 is depicted as being a single element, coordination entity 102 could include multiple sub-elements which need not be co-located. Furthermore, although coordination entity 102 is illustrated as being a discrete element, coordination entity 102 could be integrated with one or more other elements. For example, in certain embodiments, coordination entity 102 is integrated in wireless base station 104 such that wireless base station 104 is a primary wireless base station while remaining wireless base stations 106, 108, 110, and 112 are secondary wireless base stations. As another example, in particular embodiments, coordination entity 102 is distributed among two or more of wireless base stations 104, 106, 108, 110, and 112. As an additional example, in some embodiments, coordination entity 102 is at least partially implement in communication infrastructure, such as in a modem termination system (e.g., a cable modem termination system (CMTS), a digital subscriber line access multiplexer (DSLAM), an optical line terminal (OLT), a core network (e.g., a cellular wireless core network or a converged core network), a satellite ground station, a fiber node, a remote terminal (RT), a network router, an optical network unit (ONU), a network switch, a network hub, or the like.

FIG. 1 illustrates an example of communication network 100 at a time prior to a coordination event where each wireless base station is operating in a normal operating mode. In this example, wireless base stations 104, 108, and 110 are operating on a wireless communication channel A, wireless base station 112 is operating on a wireless communication channel B, and wireless base station 106 is operating on a wireless communication channel C, as depicted in FIG. 1. As such, three wireless base stations (i.e., wireless base stations 104, 108, and 110) share wireless communication channel A, and two or more of these wireless base stations might interfere with each other if they are sufficiently close together.

Figure 2:
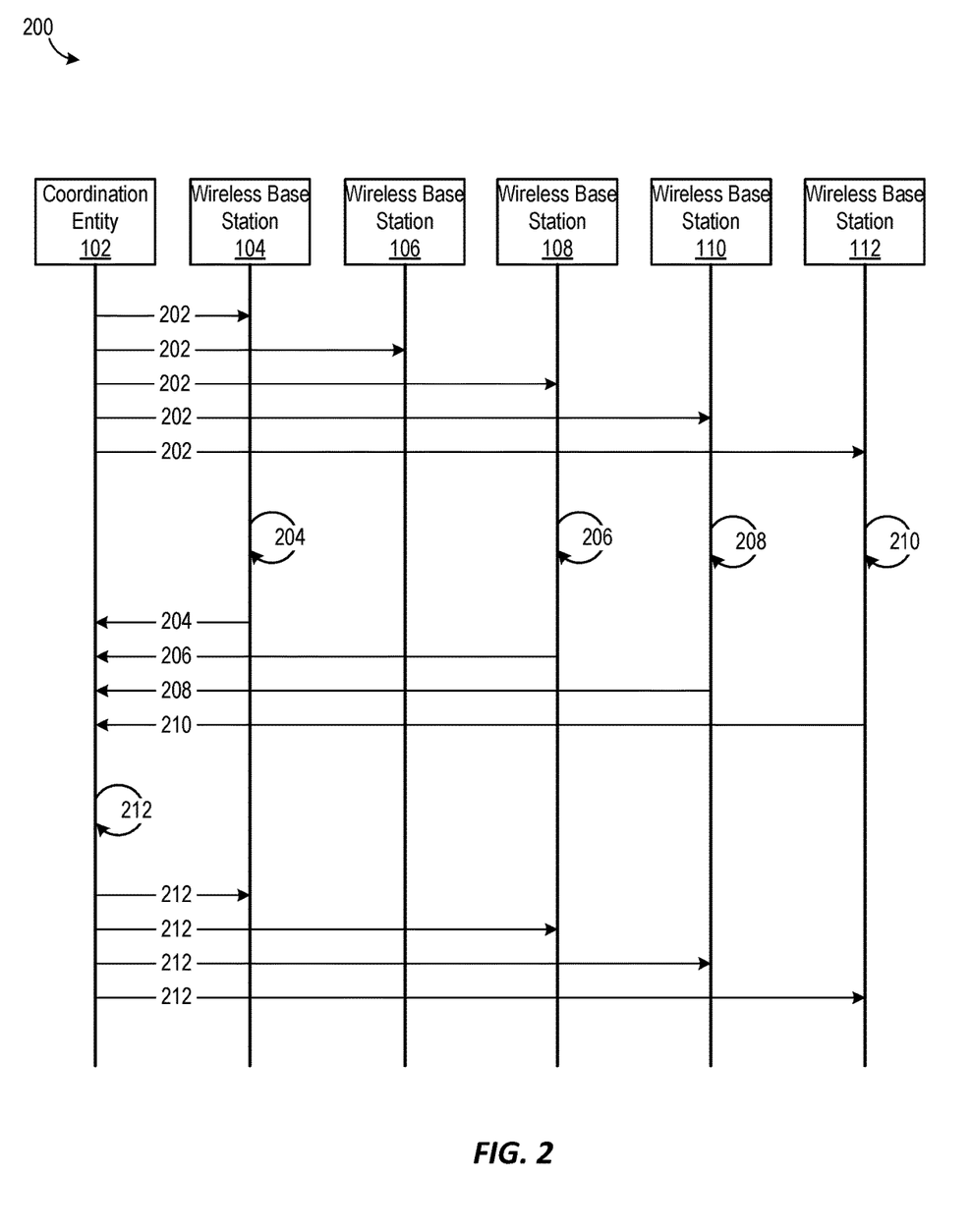
FIG. 2 is a dataflow diagram illustrating one example of data flow associated with a coordination event in the FIG. 1 communication network.

FIG. 2 is a dataflow diagram 200 illustrating one example of data flow associated with a coordination event in communication network 100. It is understood, however, that communication network 100 is not limited to operating according to this example and that communication network 100 could instead operate in other manners.

Figure 3:
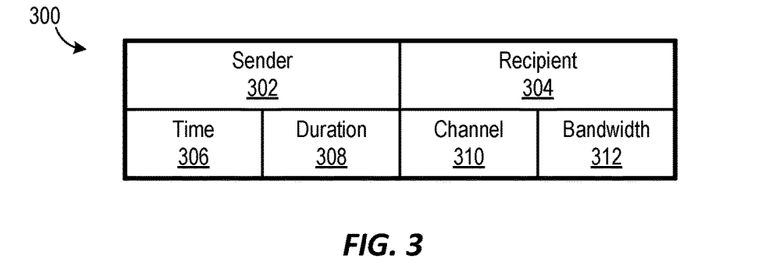
FIG. 3 is a block diagram of one example of a coordination message in the FIG. 1 communication network.

Dataflow diagram 200 begins with coordination entity 102 sending a coordination message 202 to each of wireless base stations 104, 106, 108, 110, and 112. Coordination message 202 includes, for example a scheduled time of an upcoming coordination event in communication network 100, a duration of the upcoming coordination event, and identity of a wireless communication channel to be used during the upcoming coordination event. For example, FIG. 3 is a block diagram of a coordination message 300, which is one embodiment of coordination message 200 of FIG. 2. Coordination message 300 includes fields 302, 304, 306, 308, 310, and 312 representing the entity sending the message, the intended recipient of the message, the scheduled time of the coordination event, the duration of the coordination event, the wireless communication channel to be used during the coordination event, and the bandwidth of the wireless communication channel to be used during the coordination event, respectively. The quantity and purpose of the fields of coordination message 300 may vary without departing from the scope hereof. For example, some alternate embodiments of coordination message 300 omit wireless communication channel bandwidth field 312, such as embodiments where coordination events are conducted using a predetermined wireless communication channel bandwidth.

FIG. 2 illustrates coordination entity 102 directly sending an instance of coordination message 202 to each wireless base station 104, 106, 108, 110, and 112, such as using wired and/or wireless backhaul links (not shown) to each of the wireless base stations. However, coordination messages 202 could instead be distributed to wireless base stations 104, 106, 108, 110, and 112 in another manner, such as using peer-to-peer communication among the wireless base stations.

Figure 4:
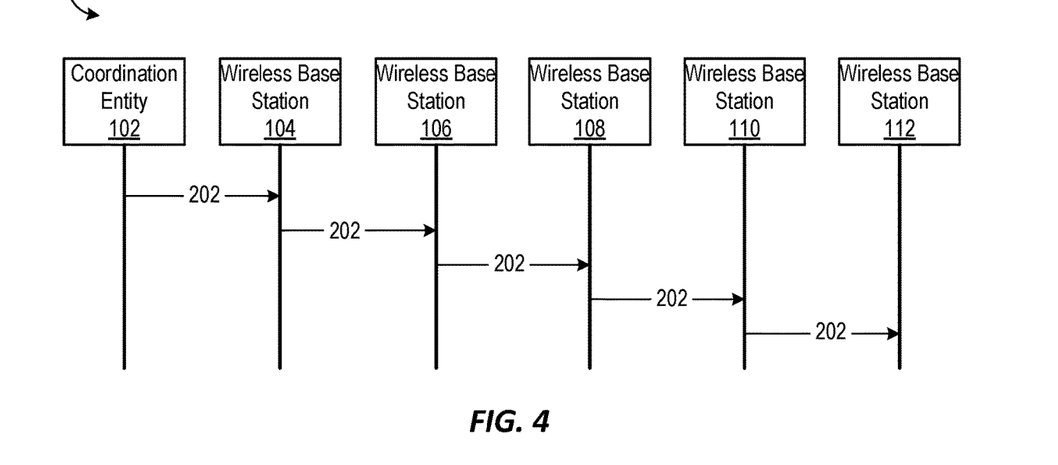
FIG. 4 is a signal flow diagram illustrating an alternative flow of coordination messages in the FIG. 1 communication network.

For example, FIG. 4 is a signal flow diagram 400 illustrating an alternate embodiment of the FIG. 2 signal flow example where coordination messages 202 are sent to wireless base stations in a peer-to-peer manner. In particular, coordination entity 102 sends coordination message 202 to wireless base station 104, and wireless base station 104 sends coordination message 202 to wireless base station 106. Wireless base station 106 sends coordination message 202 to wireless base station 108, and wireless base station 108 sends coordination message 202 to wireless base station 110. Wireless base station 110, in turn, sends coordination message 202 to wireless base station 112. In an alternate embodiment (not shown), one or more of wireless base stations 104, 106, 108, 110, and 112 send coordination message 202 to two or more different wireless base stations, and a given wireless base station may receive coordination message 202 from two or more other wireless base stations. For example, in a particular alternate embodiments, each wireless base station may forward coordination message 202 to each other wireless base station in range, such that coordination message 202 spreads among wireless base stations in communication network 100 in a manner analogous to how a computer virus spreads among computers of a network.

Figure 5:
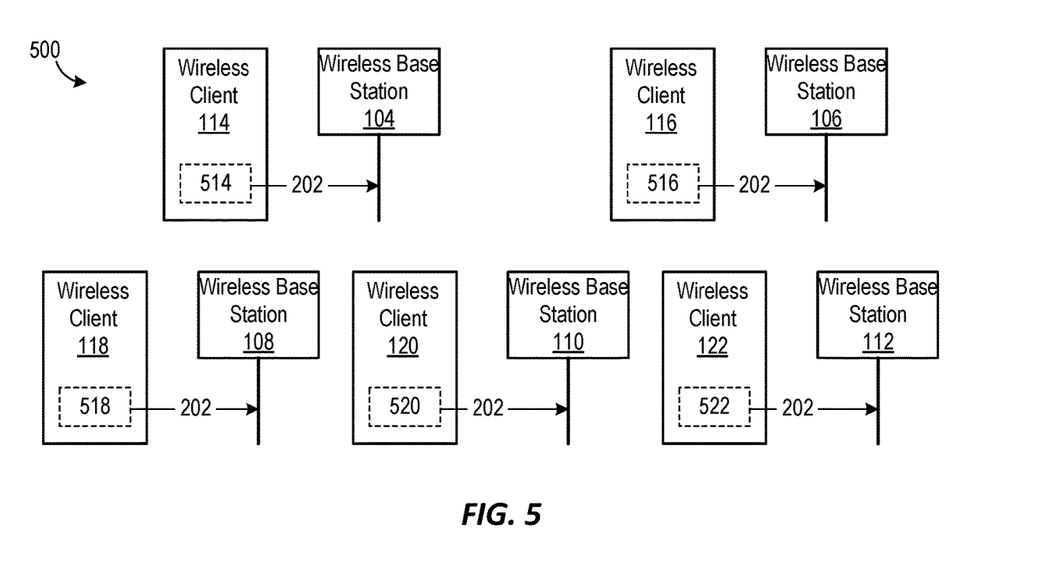
FIG. 5 is a signal flow diagram illustrating another alternative flow of coordination messages in the FIG. 1 communication network.

Furthermore, in some alternate embodiments of communication network 100, coordination messages 202 are delivered to wireless base stations 104, 106, 108, 110, and 112 at least partially out-of-band with respect to wireless base stations 104, 106, 108, 110, and 112, i.e., using one or more communication channels other than logical communication channels between the wireless base stations. For example, FIG. 5 is a signal flow diagram 500 illustrating an alternate embodiment of communication network 100 where respective applications 514, 516, 518, 520, and 522 of wireless clients 114, 116, 118, 120, and 122 generate coordination messages 202 for respective wireless base stations 104, 106, 108, 110, and 112. Applications 514, 516, 518, 520, and 522 collectively embody at least a portion of coordination entity 102. For example, in some embodiments, applications 514, 516, 518, 520, and 522 cooperate with a central resource, e.g., a cloud-based resource, to generate coordination messages 202. As another example, in some other embodiments, applications 514, 516, 518, 520, and 522 are capable of communicating with each other, and the applications collectively generate coordination messages 202 without assistance of a central resource.

Moreover, in other alternate embodiments of communication network 100, coordination messages 202 are delivered to wireless base stations 104, 106, 108, 110, and 112 using a plurality of manners, such as using a combination of two or more of the aforementioned manners. For example, in one particular embodiment, coordination entity 102 sends coordination message 202 directly to one or more wireless base stations of communication network 100, and applications of one or more wireless clients (a) forward coordination message 202 to other wireless base stations and/or (b) generate a respective additional instance of coordination message 202 and send it to other wireless base stations. As an additional example, in another particular embodiment, applications of one or more wireless clients send coordination messages 202 to one or more wireless base stations, and each wireless base station receiving the coordination message forwards the coordination message to one or more other wireless base stations using a peer-to-peer communication technique.

Figure 6:
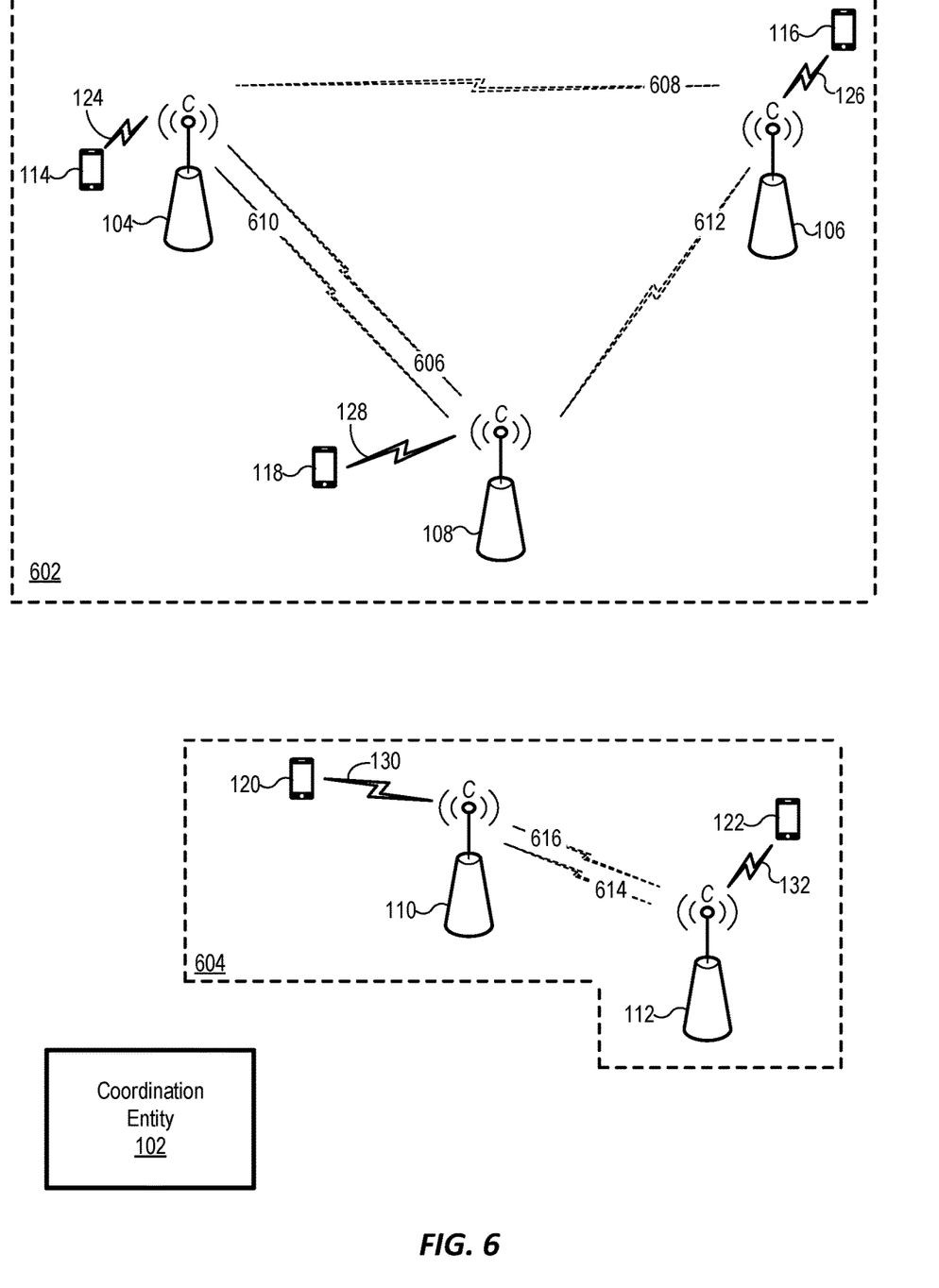
FIG. 6 illustrates an example of the FIG. 1 communication network during a coordination event.

Referring again to FIG. 2, wireless base stations 104, 108, 110, and 112 operate in respective coordination operating modes at the time, and for the duration, specified by coordination message 202. Wireless base station 106, however does not participate in the coordination event, and wireless base station 106 thereby continues to operate in its normal operating mode during the coordination event. For example, wireless base station 106 may not be capable of participating in the coordination event, or wireless base station 106 may have been configured to not participate in the coordination event. Each wireless base station 104, 108, 110, and 112 operates on a common wireless communication channel during the coordination event, as specified by coordination message 202. For example, FIG. 6 is a block diagram of communication network 100 illustrating one example of operation of the communication network during the coordination event where each of wireless base stations 104, 108, 110, and 112 operates in its coordination operating mode. In this example, coordination message 202 specifies that wireless communication channel C is to be used as the common wireless communication channel during the coordination event. Accordingly, each of wireless base stations 104, 108, and 110 switches from wireless communication channel A to wireless communication channel C in response to coordination message 202, as evident when comparing FIG. 1, which depicts communication network 100 in a normal operating mode prior to the coordination event, to FIG. 6, which depicts communication network 100 during the coordination event. Similarly, wireless base station 110 switches from wireless communication channel B to wireless communication channel C at the beginning of the coordination event. Although wireless base station 106 does not participate in the coordination event, it coincidentally operates on the same wireless communication channel, i.e., wireless communication channel C, specified in coordination message 202.

Each wireless base station 104, 108, 110, and 112 advantageously continues to support its respective wireless client 114, 118, 120, and 122 during the coordination event, albeit using common wireless communication channel C which is shared among all of the wireless base stations. In certain embodiments, wireless base stations 104, 108, 110, and 112 notify their respective wireless clients 114, 118, 120, and 122 of the switch to wireless communication channel C, such as before making the channel switch, to minimize or prevent interruption of service to the wireless clients at the beginning of the coordination event.

Each wireless base station 104, 108, 110, and 112 monitors the common wireless communication channel, i.e., wireless communication channel C in the FIG. 6 example, for wireless communication signals transmitted by other wireless base stations on the common wireless communication channel during the coordination event. In the case of communication network 100, wireless base stations 104, 106, and 108 are sufficiently close to each other that they are in range of each other, or in other words, each of wireless base stations 104, 106, and 108 will generally be capable of detecting wireless communication signals being transmitted by each other wireless base station 104, 106, and 108 on wireless communication channel C. As such, wireless base stations 104, 106, and 108 may be considered to belong to an interference group 602, which could alternately be referred to as a cluster 602. Additionally, wireless base stations 110 and 112 are sufficiently close to each other that they are in range of each other, or in other words, each of wireless base stations 110 and 112 will generally be capable of detecting wireless communication signals being transmitted by each other wireless base station 110 and 112 on wireless communication channel C. Accordingly, wireless base stations 110 and 112 may be considered to belong to an interference group 604 or a cluster 604.

The wireless base stations of interference group 602, however, are sufficiently far away from the wireless base stations of interference group 604 to be out of range of these wireless base stations. Consequently, a given wireless base station of interference group 602 will generally not be capable of detecting a wireless communication signal generated by any wireless base station of interference group 604, or vice versa. Therefore, interference group 602 may also be considered an isolation group with respect to wireless base stations 110 and 112, i.e., wireless base stations 104, 106, and 108 are isolated from wireless base stations 110 and 112 at least when using wireless communication channel C. Analogously, interference group 604 may also be considered an isolation group with respect to wireless base stations 104, 106, and 108, i.e., wireless base stations 110 and 112 are isolated from wireless base stations 104, 106, and 108 at least when using wireless communication channel C.

As discussed above, each wireless base station participating in the coordination event monitors common wireless communication channel C for wireless communication signals transmitted by other wireless base stations during the coordination event. Accordingly, wireless base station 104 monitors wireless communication channel C and detects wireless communication signals 606 and 608 transmitted by wireless base stations 108 and 106, respectively. Additionally, wireless base station 108 monitors wireless communication channel C and detects wireless communication signals 610 and 612 transmitted by wireless base stations 104 and 106, respectively. Moreover, wireless base station 110 monitors communication channel C and detects wireless communication signals 614 transmitted by wireless base station 112, and wireless base station 112 monitors wireless communication channel C and detects wireless communication signals 616 transmitted by wireless base station 110. It should be noted that wireless communication signals transmitted by wireless base station 106 on wireless communication channel C are detected by other wireless base stations even though wireless base station 106 is not participating in the coordination event.

Referring again to FIG. 2, each wireless base station 104, 108, 110, and 112 generates respective environmental data 204, 206, 208, and 210 at least partially based on the wireless communication signals it detected during the coordination event. For example, wireless base station 104 generates environmental data 204 at least partially based on wireless communication signals 608 and 610 detected on wireless communication channel C during the coordination event, and wireless base station 108 generates environmental data 206 at least partially based on wireless communication signals 610 and 612 detected on wireless communication channel C during the coordination event. In some embodiments, environmental data 204, 206, 208, and 210 includes a quantity of detected other wireless base stations using the common wireless communication channel during the coordination event. For example, environmental data 204 generated by wireless base station 104 may indicate that wireless base station 104 detected two other wireless base stations, i.e., wireless base stations 106 and 108, using wireless communication channel C during the coordination event. As another example, environmental data 208 generated by wireless base station 110 may indicate that wireless base station 110 detected one other wireless base station, i.e., wireless base station 112, using wireless communication channel C during the coordination event.

Additionally, in some embodiments, environmental data 204, 206, 208, and 210 includes an identity of other detected other wireless base stations using the common wireless communication channel during the coordination event. For example, environmental data 206 generated by wireless base station 108 may indicate that wireless base station 108 identified wireless base stations 104 and 106 using wireless communication channel C during the coordination event. As another example, environmental data 210 generated by wireless base station 112 may indicate that wireless base station 112 identified wireless base station 110 using wireless communication channel C during the coordination event. In certain embodiments, identities of wireless base stations are expressed by wireless base station Media Access Control (MAC) addresses, wireless base station Basic Service Set Identifiers (BSSIDs), wireless base station Internet Protocol (IP) addresses, wireless base station location information, and/or wireless base station serial numbers.

Furthermore, in particular embodiments, environmental data 204, 206, 208, and 210 includes signal strength of detected wireless communication signals transmitted by other wireless base stations during the coordination event. For example, environmental data 204 generated by wireless base station 104 may include respective received signal strength of wireless communication signals 606 and 608 detected by wireless base station 104 on communication channel C during the coordination event. As another example, environmental data 208 generated by wireless base station 110 may include received signal strength of wireless communication signals 614 detected by wireless base station 110 on communication channel C during the coordination event.

Figure 7:
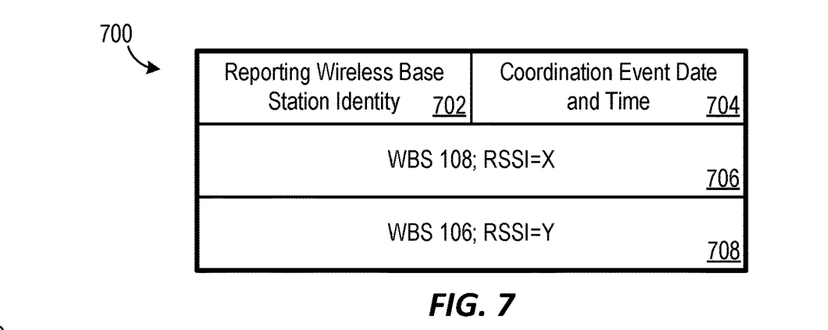
FIG. 7 is a block diagram of one example of environmental data generated by a wireless base station of the FIG. 1 communication network.

FIG. 7 is a block diagram of environmental data 700, which is one embodiment of environmental data 204 generated by wireless base station 104. Environmental data 700 includes fields 702, 704, 706, and 708. Field 702 specifies the identity of the wireless base station generating environmental data 700, i.e., wireless base station 104. Field 704 specifies the date and time of the coordination event associated with the environmental data, i.e., the date and time of the coordination event specified in coordination message 202 received by wireless base station 104. Fields 706 and 708 collectively identify each other wireless base station detected by wireless base station 104 during the coordination event and received signal strength of corresponding detected wireless communication signals. In particular, field 706 specifies that wireless base station 104 detected wireless base station (WBS) 108 during the coordination event and that a received signal strength indicator (RSSI) of detected wireless communication signals 606 from wireless base station 108 had a value of X. Field 708 specifies that wireless base station 104 also detected wireless base station 106 during the coordination event and that a received signal strength indicator of detected wireless communication signals 608 from wireless base station 108 had a value of Y.

It should be noted that the information contained in environmental data 700 will vary according to what other wireless base stations are detected by wireless base station 104 during the coordination event. Furthermore, the configuration of environmental data 700 may vary without departing from the scope hereof. For example, in an alternate embodiment, fields 706 and 708 omit RSSI values and these fields instead solely specify detected wireless base stations 108 and 106, respectively.

Environmental data 204, 206, 208, and 210 is not limited to data that is based on wireless communication signals detected during the coordination event. For example, environmental data 204, 206, 208, and 210 may include one or more characteristics of its respective wireless base station, such as wireless base station identity, wireless base station type, wireless base station configuration (e.g., configured operating channels, configured transmit power, and/or configured encryption type), wireless base station radiation pattern, wireless base station capabilities (e.g., supported channels, supported communication protocols, supported transmit power levels, and/or supported encryption types), and/or wireless base station operating history. As another example, environmental data 204, 206, 208, and 210 may include environmental data of its respective wireless base station determined outside of a coordination event, such as identity of wireless communication channels (e.g., Dynamic Frequency Selection (DFS) channels) that have achieved good performance during normal wireless base station operation, identity of wireless communication channels that have achieved poor performance during normal wireless base station operation, detected interference during normal operation, detected use of wireless communication channels by incumbent users, etc. As an additional example, environmental data 204, 206, 208, and 210 may include airtime data of its respective wireless base station. Examples of possible airtime data include, but are not limited to, average utilization of a given wireless communication channel by the wireless base station, instantaneous utilization of a given wireless communication channel by the wireless base station, trends in usage of a given wireless communication channel by the wireless base station, time of day usage of a given wireless communication channel by the wireless base station, day of week usage of a given wireless communication channel by the wireless base station, number of wireless clients supported by the wireless base station, number of clients supported by the wireless base station on each wireless communication channel (e.g., average number of clients, peak number of clients, number of clients as a function of time of day, etc.), and distance of wireless clients from the wireless base station.

Referring again to FIG. 2, wireless base stations 104, 108, 110, and 112 send their respective environmental data 204, 206, 208, and 210 to coordination entity 102. Wireless base stations 104, 108, 110, and 112 switch from their coordination operating modes to their normal operating modes at the end of the coordination event. Accordingly, wireless base stations 104, 108, 110, and 112 may switch from common wireless communication channel C back to wireless communication channels A, A, A, and B, respectively, at the end of the coordination event.

In certain embodiments, coordination entity 102 generates a coordination plan 212 at least partially based on environmental data 204, 206, 208, and 210, and coordination entity 102 may send coordination plan 212 to each of wireless base stations 104, 108, 110, and 112. In some embodiments, coordination entity 102 directly sends coordination plan 212 to each of wireless base stations 104, 108, 110, and 112 as illustrated in FIG. 2, such as using wired and/or wireless backhaul links (not shown) to each of the wireless base stations. In some other embodiments, coordination entity 102 sends coordination plan 212 to wireless base stations 104, 108, 110, and 112 in another manner, such as using peer-to-peer communication among the wireless base stations in a manner analogous to that discussed above with respect to FIG. 4, or such as using out-of-band communication similar to that discussed above with respect to FIG. 5. Additionally, in some other embodiments, coordination entity 102 sends coordination plan 212 to wireless base stations 104, 108, 110, and 112 using two or more different communication techniques, such as a combination of two or more of (a) direct transmission of coordination plan 212 to one or more wireless base stations, (b) peer-to-peer transmission of coordination plan 212 to one or more wireless base stations, and (c) transmission of coordination plan 212 to one or more wireless base stations using a respective application of one or more wireless clients. Each wireless base station 104, 108, 110, and 112 may then change one or more of its operating conditions, as needed, to conform with coordination plan 212.

Figure 8:
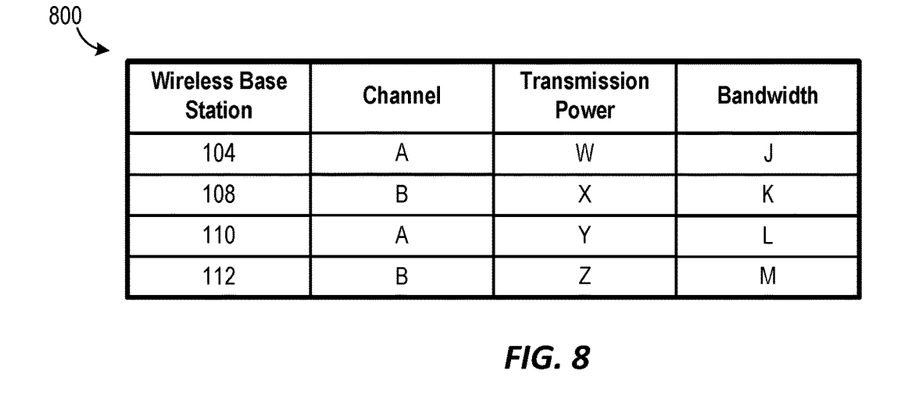
FIG. 8 is a block diagram of an example coordination plan generated by a coordination entity of the FIG. 1 communication network.

In some embodiments, coordination plan 212 specifies one or more operating characteristics of wireless base stations 104, 108, 110, and 112 that are determined by coordination entity 102 to help minimize interference between the wireless base stations of communication network 100. For example, FIG. 8 is a block diagram of a coordination plan 800, which is one possible embodiment of coordination plan 212. Coordination plan 800 specifies a respective wireless communication channel, a respective transmission power, and a respective wireless communication channel bandwidth, for each of wireless base stations 104, 108, 110, and 112, where the wireless communication channels, the transmission powers, and the bandwidths are selected to help minimize interference among the wireless base stations of communication network 100. Specifically, coordination plan specifies that (1) wireless base station 104 is to operate on wireless communication channel A with a transmission power W and a bandwidth J, (2) wireless base station 108 is to operate on wireless communication channel B with a transmission power X and a bandwidth K, (3) wireless base station 110 is to operate on wireless communication channel A with a transmission power Y and a bandwidth L, and (4) wireless base station 112 is to operate on wireless communication channel B with a transmission power Z and a bandwidth M. Each of wireless base stations 104, 108, 110, and 112 may then adjust its operating conditions, as needed, to comply with coordination plan 700.

The configuration of coordination plan 800 may vary without departing from the scope hereof. For example, coordination plan 800 could be modified to omit transmission power. As another example, coordination plan 800 could be modified to specify a RF radiation pattern for each wireless base station, in place of, or in addition to, transmission power.

Additionally, coordination plan 212 could be dynamic in that specified operating characteristics of wireless base stations 104, 108, 110, and 112 are a function of time of day, day of the week, communication network 100 load, status of incumbent wireless communication band users, and/or one or more other parameters. For example, coordination plan 800 could be modified to specify a wireless communication channel for each of wireless base stations 104, 108, 110, and 112 as a function of time of day. As another example, coordination plan 800 could be modified to specify a transmission power for each wireless base station 104, 108, 110, and 112 as a function of whether an incumbent party is using a given wireless communication channel.

Furthermore, coordination entity 102 could be configured to generate coordination plan 212 at least partially based on data other than environmental data 204, 206, 208, and 210. For example, certain embodiments of configuration entity 102 are configured to generate coordination plan 212 at least partially based on airtime data from an optional network controller (not shown) of communication network 100, as well as based on environmental data 204, 206, 208, and 210. As another example, some embodiments of configuration entity 102 are configured to generate coordination plan 212 at least partially based on usage data from an incumbent user of wireless communication channels in the vicinity of communication network 100, as well as based on environmental data 204, 206, 208, and 210. As an additional example, particular embodiments of configuration entity 102 are configured to generate coordination plan 212 at least partially based on information about wireless communication channels that had achieved good operating performance in the past, as well as based on environmental data 204, 206, 208, and 210.

Figure 9:
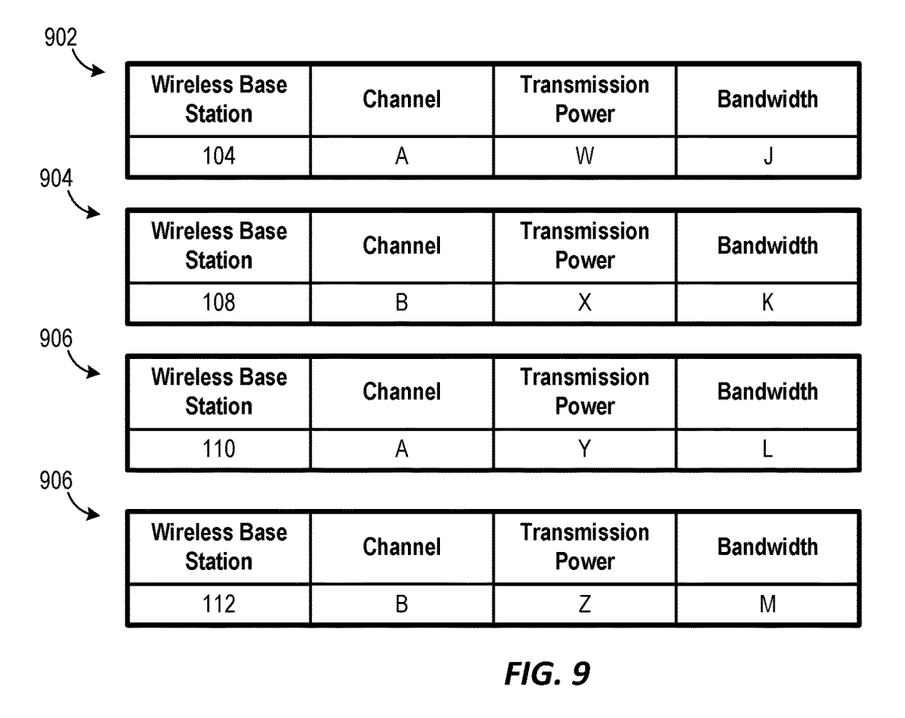
FIG. 9 is a block diagram of four example coordination plans generated by the coordination entity of the FIG. 1 communication network.

Moreover, coordination entity 102 could be configured to generate a respective coordination plan for each wireless base station 104, 108, 110, and 112, instead of generating a common coordination plan for all of the wireless base stations. For example, coordination entity 102 could be configured to generate a respective instance of coordination plan 800 for each wireless base station 104, 108, 110, and 112, where each instance of coordination plan 800 specifies a wireless communication channel and a transmission power solely for its respective base station. For example, FIG. 9 is a block diagram of four coordination plans 902, 904, 906, and 908 for wireless base stations 104, 108, 110, and 112, respectively. Coordination plans 902, 904, 906, and 908 collectively contain the same information as coordination plan 800 of FIG. 8, but each coordination plan only contains information relevant to its respective wireless base station.

Coordination entity 102 may be configured to schedule two or more coordination events where each coordination event uses a different wireless communication channel, such as to generate a respective coordination plan for each wireless communication channel. For example, a first communication channel in the 2.4 GHz band is expected to have significantly different characteristics than a second communication channel in the 5 GHz band, and coordination entity 102 therefore may schedule separate coordination events for each of the two wireless communication channels.

Additionally, certain embodiments of coordination entity 102 are configured to schedule a common coordination event for two or more different wireless communication channels, such as for two or more wireless communication channels in different frequency bands that are expected to have significantly different characteristics. For example, in some embodiments, coordination entity 102 may schedule a common coordination event for first and second wireless communication channels, e.g., for a wireless communication channel in the 2.4 GHz band and for a wireless communication channel in the 5 GHz frequency band. Each wireless base station 104, 108, 110, and 112 may then (a) operate on the first wireless communication channel and monitor the first wireless communication channel for wireless communication signals transmitted by other wireless base stations on the first wireless communication channel, for a first portion of the coordination event, (b) generate respective first environmental data at least partially based on wireless communication signals detected on the first wireless communication channel during the first portion of the coordination event, (c) operate on the second wireless communication channel and monitor the second wireless communication channel for wireless communication signals transmitted by other wireless base stations on the second wireless communication channel, for a second portion of the coordination event, and (d) generate respective second environmental data at least partially based on wireless communication signals detected on the second wireless communication channel during the second portion of the coordination event. In these embodiments, coordination entity 102 is optionally configured to generate separate coordination plans for the first environmental data and the second environmental data. For example, in an embodiment where the first environmental data corresponds to a wireless communication channel in the 2.4 GHz band and the second environmental data corresponds to a wireless communication channel in the 5 GHz band, coordination entity 102 may generate respective first and second coordination plans for the 2.4 GHz band and 5 GHz band.

Particular embodiments of coordination entity 102 are configured to schedule coordination events on a reoccurring basis, such as on a periodic basis, to help ensure that coordination plans remain up to date. For example, some embodiments of coordination entity 102 are configured to schedule a coordination event daily, weekly, monthly, quarterly, etc. As another example, some embodiments of coordination entity 102 are configured to randomly schedule coordination events, as to help ensure that a wireless communication environment is evaluated over a wide variety of communication network operating conditions. Furthermore, some embodiments of coordination entity 102 are configured to use artificial intelligence or other machine learning to help optimize scheduling of coordination events, such as to achieve a desired balance between maintaining current coordination plans and minimizing impact of coordination events on communication network 100 performance.

Furthermore, it is generally desirable that duration of a coordination event be as short as required to obtain sufficient environmental data, to minimize any degradation of communication network 100 performance caused by the coordination event. Accordingly, some embodiments of coordination entity 102 are configured to adjust coordination event duration based on experience with previous coordination events. For example, coordination entity 102 may determine that a previous coordination event did not require its full allocated time duration, and coordination entity 102 may therefore reduce duration of a next scheduled coordination event. Additionally, certain embodiments of coordination entity 102 are configured to use artificial intelligence or other machine learning to help optimize coordination duration.

Figure 10:
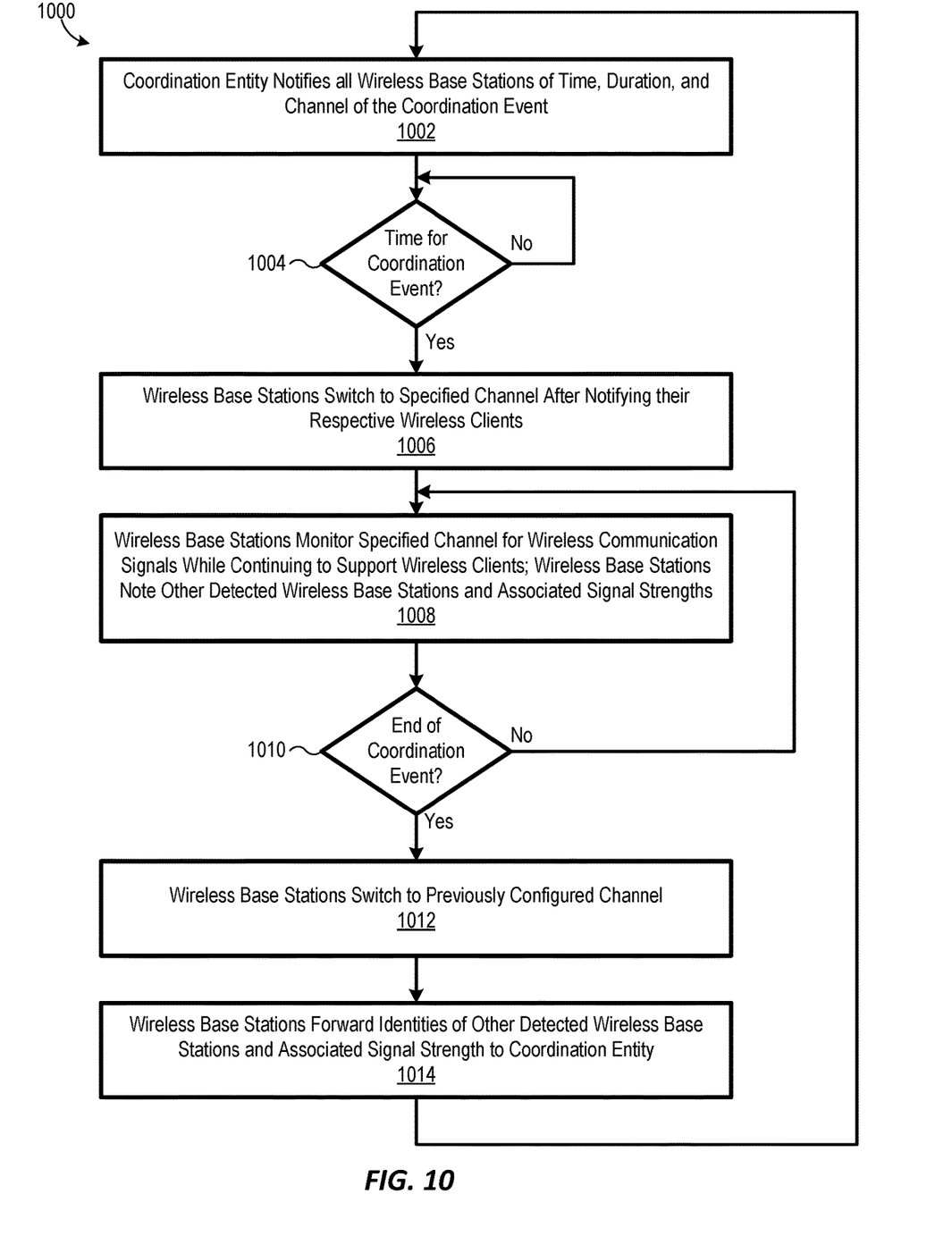
FIG. 10 is a flow chart of a method for evaluating a wireless communication environment, according to an embodiment.

FIG. 10 is a flow chart of a method 1000 for evaluating a wireless communication environment. Although method 1000 is discussed below with respect to communication network 100, method 1000 is not limited to use with communication network 100. Additionally, communication network 100 is not limited to use according to method 1000.

In a block 1002 of method 1000, a coordination entity notifies all wireless base stations of a time, a duration, and a wireless communication channel, of an upcoming coordination event. In one example of block 1002, coordination entity 102 sends a coordination message 202 directly or indirectly to each of wireless base stations 104, 106, 108, 110, and 112, notifying the wireless base stations of an upcoming coordination event. In a decision block 1004, each wireless base station determines if it is time for the coordination event. In one example of decision block 1004, wireless base stations 104, 108, 110, and 112 determine if it is time for the coordination event as specified by coordination message 202. If the result of decision block 1004 is yes, method 1000 proceeds to a block 1006, and if the result of decision block 1004 is no, method 1000 returns to decision block 1004.

In block 1006, the wireless base stations switch to the wireless communication channel specified for the coordination event if the wireless base stations are not already operating on the specified wireless communication channel. In one example of block 1006, wireless communication channel C is specified in coordination message 202, wireless base stations 104, 108, and 110 switch from wireless communication channel A to wireless channel C, and wireless base station 112 switches from wireless communication channel B to wireless communication channel C, as discussed above with respect to FIG. 6. In a block 1008 of method 1000, the wireless base stations monitor the specified wireless communication channel for wireless communication signals while continuing to support their respective wireless clients, and the wireless base stations note any other detected wireless base stations and their associated received signal strengths. In one example of block 1008, wireless base stations 104, 108, 110, and 112 monitor wireless communication channel C for presence of wireless communication signals while continuing to support their respective wireless clients, and wireless base stations 104, 108, 110, and 112 note presence of any other wireless base stations using wireless communication channel C and received signal strength of wireless communication signals transmitted by the other wireless base stations.

In a decision block 1010, each wireless base station determines if the coordination event has ended. If the result of decision block 1010 is yes, method 1000 proceeds to a block 1012, and if the result of decision block 1010 is no, method 1000 returns to block 1008. In block 1012, the wireless base stations switch to their respective previously configured wireless communication channel, if the previously configured wireless communication channel is not the same as the current wireless communication channel. In one example of block 1012, each of wireless base stations 104, 108, and 110 switches from wireless communication channel C to previously configured wireless communication channel A, and wireless base station 112 switches from wireless communication channel C to previously configured wireless communication channel A. In a block 1014, the wireless base stations forward identities of other detected wireless base stations and their associated signal strengths to the coordination entity. In one example of block 1014, wireless base stations 104, 108, 110, and 120 directly or indirectly forward to coordination entity 102 identities of other wireless base stations detected using wireless communication channel C, as well as associated signal strengths, via respective environmental data 204, 206, 208, and 210. Method 1000 returns to block 1002 after executing block 1014.

Figure 11:
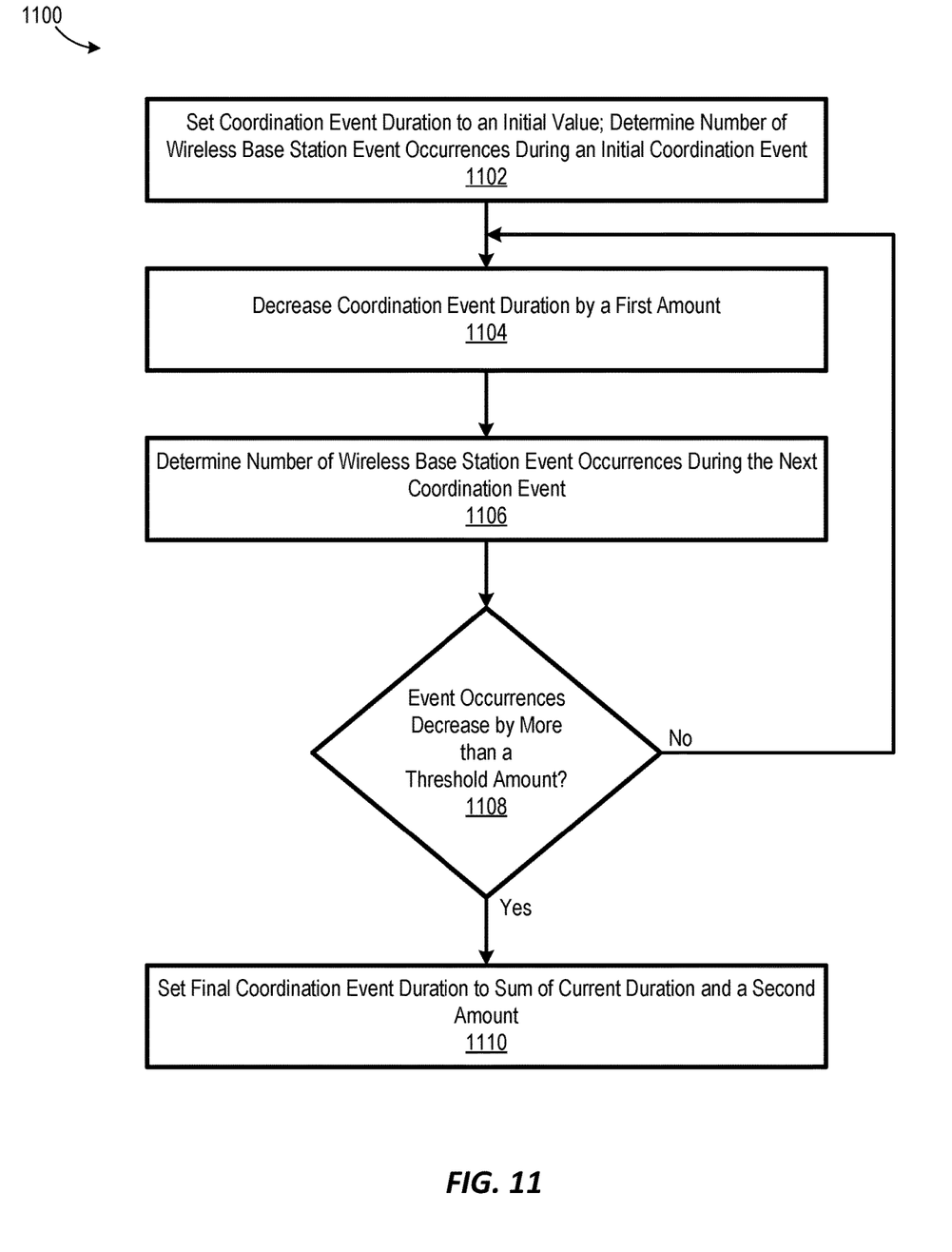
FIG. 11 is a flow chart of a method for setting an optimum time of a coordination event, according to an embodiment.

FIG. 11 is a flow chart of a method 1100 for setting an optimum time of a coordination event. Although method 1100 is discussed below with respect to communication network 100, method 1100 is not limited to use with communication network 100. Additionally, communication network 100 is not limited to use according to method 1100.

In a block 1102 of method 1100, a coordination entity sets a coordination event duration to an initial value, and the coordination entity determines a number of wireless base station events occurring during an initial coordination event. While not required, the initial value is typically selected to be sufficiently long to ensure detection of all wireless base station events. In some embodiments, a wireless base station event includes a wireless base station identifying another wireless base station using a common wireless communication channel during the coordination event. For example, wireless base station 104 may experience two event occurrences by detecting two wireless base stations, i.e., wireless base stations 108 and 106, using common wireless communication C during an initial coordination event. In one example of block 1102, coordination entity 102 sets a coordination event duration to either 5 minutes or 10 minutes, and coordination entity 102 determines from environment data 204, 206, 208, and 210 that six wireless base station events occurred during an initial coordination event, e.g., six wireless base stations were collectively detected by wireless base stations 104, 106, 110, and 112 using common wireless communication channel C during the initial coordination event. It should be noted that these six detected wireless base stations may not be unique wireless base stations. For example, wireless base station 106 may be detected by both of wireless base stations 104 and 108, and wireless base station 106 may therefore be counted as two detected wireless base stations.

In a block 1104 of method 1100, the coordination entity decreases coordination event duration by a first amount. While not required, it is anticipated that the first amount will typically be a small percentage of the initial value set in block 1102. In one example of block 1104, coordination entity 102 decreases the coordination event duration by either 15 seconds, 30 seconds, or 45 seconds. In a block 1106 of method 1100, the coordination entity determines a number of wireless base station events that occurred during a next coordination event. In one example of block 1106, coordination entity 102 determines from environment data 204, 206, 208, and 210 that only five wireless base station events occurred during the next coordination event, e.g., only five wireless base stations were collectively detected by wireless base stations 104, 106, 110, and 112 using common wireless communication channel C during the next coordination event.

In decision block 1108, the coordination entity determines whether wireless base station event occurrences decreased by more than a threshold amount after execution of block 1104. If the result of decision block 1108 is no, method 1100 returns to block 1104. If the result of decision block 1108 is yes, method 1100 proceeds to a block 1110 where the coordination entity sets a final coordination event duration to a sum of the current duration plus a second amount. While not required, it is anticipated that the second amount will typically be a small percentage of the initial value set in block 1102. In one example of block 1110, coordination entity 102 increases the current coordination event duration by either 15 seconds, 30 seconds, or 45 seconds to obtain a final coordination event duration, and future coordination events have the final coordination event duration.

Combinations of Features

Features described above may be combined in various ways without departing from the scope hereof. The following examples illustrate some possible combinations.

(A1) A method for evaluating a wireless communication environment includes (1) causing each of a first wireless base station and a second wireless base station to operate in a respective coordination operating mode where each of the first and second wireless base stations supports wireless communication using a common wireless communication channel and (2) receiving first environmental data from the first wireless base station, the first environmental data representing one or more characteristics of the common wireless communication channel from a perspective of the first wireless base station.

(A2) In the method denoted as (A1), the one or more characteristics of the common wireless communication channel from the perspective of the first wireless base station may include an identity of one or more other wireless base stations using the common wireless communication channel.

(A3) In any one of the methods denoted as (A1) and (A2), the one or more characteristics of the common wireless communication channel from the perspective of the first wireless base station may include signal strength of one or more communication signals received by the first wireless base station from one or more other wireless base stations.

(A4) In any one of the methods denoted as (A1) through (A3), the one or more characteristics of the common wireless communication channel from the perspective of the first wireless base station may include a quantity of other wireless base stations using the common wireless communication channel.

(A5) In any one of the methods denoted as (A1) through (A4), causing the first wireless base station to operate in its respective coordination operating mode may include causing the first wireless base station to switch to the common wireless communication channel from another wireless communication channel.

(A6) In any one of the methods denoted as (A1) through (A5), each of the first and second wireless base stations may be a Wi-Fi wireless base station.

(A7) Any one of the methods denoted as (A1) through (A6) may further include receiving second environmental data from the second wireless base station, the second environment data representing one or more characteristics of the common wireless communication channel from a perspective of the second wireless base station.

(A8) The method denoted as (A7) may further include generating a coordination plan for at least each of the first and second wireless base stations at least partially based on the first and second environmental data.

(A9) In the method denoted as (A8), the coordination plan may specify at least (a) a wireless communication channel for the first wireless base station to use and (b) a wireless communication channel for the second wireless base station to use.

(B1) A method for evaluating a wireless communication environment includes (1) operating a first wireless base station in a normal operating mode, the normal operating mode being characterized at least partially by the first wireless base station wirelessly communicating with one or more clients using a first wireless communication channel and (2) switching the first wireless base station from the normal operating mode to a coordination operating mode. The coordination operating mode is characterized at least partially by (1) the first wireless base station communicating with the one or more clients using a second wireless communication channel and (2) the first wireless base station generating environmental data representing one or more characteristics of the second wireless communication channel from a perspective of the first wireless base station.

(B2) The method denoted as (B1) may further include switching the first wireless base station from the coordination operating mode to the normal operating mode after the first wireless base station operates in the coordination operating mode for a predetermined duration.

(B3) In any one of the methods denoted as (B1) and (B2), the coordination operating mode may be further characterized by the first wireless base station sending the environmental data to a coordination entity.

(B4) In any one of the methods denoted as (B1) through (B3), the first environmental data may include an identity of one or more other wireless base stations using the second wireless communication channel.

(B5) In any one of the methods denoted as (B1) through (B4), the first environmental data may include signal strength of one or more communication signals received by the first wireless base station from one or more other wireless base stations.

(B6) In any one of the methods denoted as (B1) through (B5), the environmental data may include a quantity of other wireless base stations that are determined by the first wireless base station to be using the second wireless communication channel.

(B7) Any one of the methods denoted as (B1) through (B6) may further include (1) receiving, at the first wireless base station, a coordination message, and (2) switching the first the first wireless base station from the normal operating mode to the coordination operating mode in accordance with the coordination message.

(C1) A method for evaluating a wireless communication environment includes (1) sending a coordination message from a coordination entity to each of a first wireless base station and a second wireless base station, (2) switching a channel of the first wireless base station from a first channel to a second channel in accordance with the coordination message, (3) generating first environment data representing one or more characteristics of the second wireless communication channel from a perspective of the first wireless base station, and (4) generating second environment data representing one or more characteristics of the second wireless communication channel from a perspective of the second wireless base station.

(C2) The method denoted as (C1) may further include switching a channel of the second wireless base station from a third channel to the second channel, in accordance with the coordination message.

(C3) Either one of methods denoted as (C1) and (C2) may further include (1) sending the first environmental data from the first wireless base station to the coordination entity and (2) sending the second environmental data from the second wireless base station to the coordination entity.

(C4) The method denoted as (C3) may further include generating a coordination plan for at least the first and second wireless base stations at least partially based on the first and second environmental data.

(C5) In any one of the methods denoted as (C1) through (C4), sending the coordination message from the coordination entity to each of the first wireless base station and the second wireless base station may include sending the coordination message from the coordination entity directly to each of the first wireless base station and the second wireless base station.

(C6) In any one of the methods denoted as (C1) through (C4), sending the coordination message from the coordination entity to each of the first wireless base station and the second wireless base station may include sending the coordination message to the second wireless base station via the first wireless base station.

(C7) In any one of the methods denoted as (C1) through (C6), the coordination entity may include (a) an application of a wireless client of the first wireless base station and (b) an application of a wireless client of the second wireless base station.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for evaluating a wireless communication environment, the method comprising:
   causing each of a first wireless base station and a second wireless base station to operate in a respective coordination operating mode wherein at least one of the first wireless base station and the second wireless base station switches from a respective normal wireless communication channel to a common wireless communication channel, so that each of the first and second wireless base stations supports wireless communication using the common wireless communication channel; and
   receiving first environmental data from the first wireless base station, the first environmental data representing one or more characteristics of the common wireless communication channel from a perspective of the first wireless base station.

2. The method of claim 1, wherein the one or more characteristics of the common wireless communication channel from the perspective of the first wireless base station comprise an identity of one or more other wireless base stations using the common wireless communication channel.

3. The method of claim 1, wherein the one or more characteristics of the common wireless communication channel from the perspective of the first wireless base station comprise signal strength of one or more communication signals received by the first wireless base station from one or more other wireless base stations.

4. The method of claim 1, wherein the one or more characteristics of the common wireless communication channel from the perspective of the first wireless base station comprise a quantity of other wireless base stations using the common wireless communication channel.

5. The method of claim 1, wherein each of the first and second wireless base stations is a Wi-Fi wireless base station.

6. The method of claim 1, further comprising receiving second environmental data from the second wireless base station, the second environment data representing one or more characteristics of the common wireless communication channel from a perspective of the second wireless base station.

7. The method of claim 6, further comprising generating a coordination plan for at least each of the first and second wireless base stations at least partially based on the first and second environmental data.

8. The method of claim 7, where the coordination plan specifies at least (a) a wireless communication channel for the first wireless base station to use and (b) a wireless communication channel for the second wireless base station to use.

9. A method for evaluating a wireless communication environment, the method comprising:
   sending a coordination message from a coordination entity to each of a first wireless base station and a second wireless base station;
   switching a channel of the first wireless base station from a first wireless communication channel to a second wireless communication channel in accordance with the coordination message;
   generating first environmental data representing one or more characteristics of the second wireless communication channel from a perspective of the first wireless base station;
   sending the first environmental data from the first wireless base station to the coordination entity;
   generating second environmental data representing one or more characteristics of the second wireless communication channel from a perspective of the second wireless base station;
   sending the second environmental data from the second wireless base station to the coordination entity; and
   generating a coordination plan for at least the first and second wireless base stations at least partially based on the first and second environmental data.

10. The method of claim 9, further comprising switching the channel of the first wireless base station from the second wireless communication channel to the first wireless communication channel after the first wireless base station operates in a coordination operating mode for a predetermined duration.

11. The method of claim 9, wherein the first environmental data comprises an identity of one or more wireless base stations other than the first wireless base station using the second wireless communication channel.

12. The method of claim 9, wherein the first environmental data comprises signal strength of one or more communication signals received by the first wireless base station from one or more other wireless base stations.

13. The method of claim 9, wherein the first environmental data comprises a quantity of wireless base stations other than the first wireless base station that are determined by the first wireless base station to be using the second wireless communication channel.

14. The method of claim 9, further comprising switching a channel of the second wireless base station from a third wireless communication channel to the second wireless communication channel, in accordance with the coordination message.

15. The method of claim 9, wherein sending the coordination message from the coordination entity to each of the first wireless base station and the second wireless base station comprises sending the coordination message from the coordination entity directly to each of the first wireless base station and the second wireless base station.

16. The method of claim 9, wherein the coordination entity comprises (a) an application of a wireless client of the first wireless base station and (b) an application of a wireless client of the second wireless base station.

17. A method for evaluating a wireless communication environment, the method comprising:
   sending a coordination message from a coordination entity to each of a first wireless base station and a second wireless base station;
   switching a channel of the first wireless base station from a first wireless communication channel to a second wireless communication channel in accordance with the coordination message;

generating first environmental data representing one or more characteristics of the second wireless communication channel from a perspective of the first wireless base station; and generating second environmental data representing one or more characteristics of the second wireless communication channel from a perspective of the second wireless base station;

wherein sending the coordination message from the coordination entity to each of the first wireless base station and the second wireless base station comprises sending the coordination message to the second wireless base station via the first wireless base station.

\* \* \* \* \*